Figure 1:
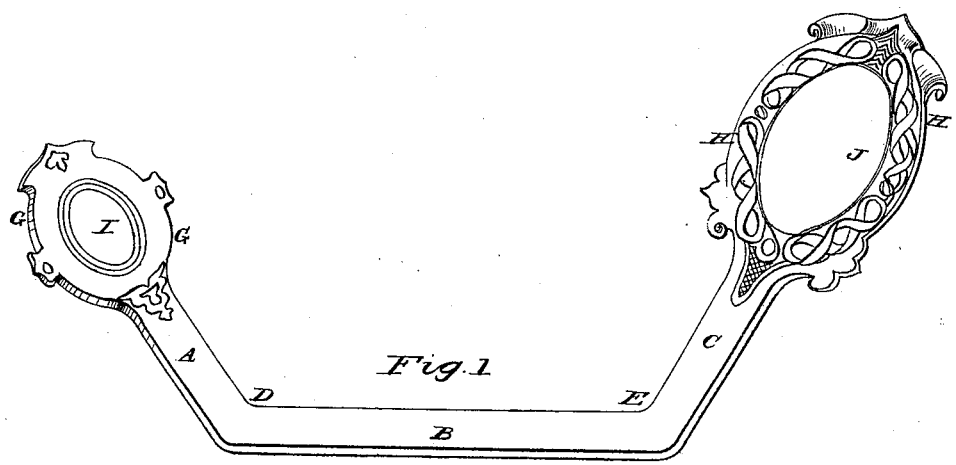
Figure 2:

J. Johnson,
Mirror,
N°. 50,659.  Patented Oct. 24, 1865.

Witnesses:
Michael J. Haviland
Charles A. Seely

Inventor
John Johnson

UNITED STATES PATENT OFFICE.

JOHN JOHNSON, OF SACO, MAINE, ASSIGNOR TO HIMSELF AND HOWARD TILDEN, OF BOSTON, MASSACHUSETTS.

TOILET-MIRROR.

Specification forming part of Letters Patent No. 50,659, dated October 24, 1865.

*To all whom it may concern:*

Be it known that I, JOHN JOHNSON, of Saco, in the county of York and State of Maine, have invented an Improvement in Toilet-Mirrors; and I do hereby that the following is a full and exact description thereof, reference being had to the accompanying drawings, and to the letters of reference marked thereon.

My improvement in toilet-mirrors is intended to be used for the inspection of the teeth, mouth, and other parts that are not visible except by double reflections. It is also useful for the examination of the hair and the back of the head, for which purpose the instrument is made larger than for the mouth or other cavities.

The common mode of holding one glass in the hand and reflecting an image in a fixed mirror is inconvenient, while by the combination of mirrors adopted in my improvement the parts that are to be examined are readily brought into view.

Figure I is a perspective view of the mirror. Fig. II is a longitudinal section, showing the instrument folded and placed in a case.

A strip of stiff leather or card-board, A B C, forms a holder or support for two mirrors, I and J, placed at the ends of the holder. The small mirror I is placed in the frame G, attached to the end A of the holder, the mirror J being held in the frame H, which is fastened to the opposite end, C. The flexible support A B C is folded together at the point D and E, as represented in Fig. II, to adapt it to the case N O. The rays of light that fall upon the small glass I from the object to be examined are reflected to the eye from the large glass J, the adjustment of the glasses to the proper position being made by means of the parts A and C and the joints D and E.

When the holder is made of wood, hinges or universal joints are used at the points of flexure D and E, which allow the glasses to move directly back and forth with reference to each other, and also to be turned or twisted as occasion requires.

What I claim, and desire to secure by Letters Patent, is—

The flexible and adjustable holder carrying a mirror at each end, combined and arranged substantially as herein described, and for the purpose specified.

JOHN JOHNSON. [L. S.]

In presence of—
 MICHAEL J. HAVILAN,
 CHARLES S. SEELY.